US006810834B2

(12) United States Patent
Hutchings et al.

(10) Patent No.: US 6,810,834 B2
(45) Date of Patent: Nov. 2, 2004

(54) AGRICULTURAL FLOOR PANEL

(75) Inventors: Warren W. Hutchings, Calgary (CA); Thomas Christie, Calgary (CA); Warren J. Blatz, Calgary (CA)

(73) Assignee: Agra Flooring International Ltd., Calgary (CA)

( * ) Notice: Subject to any disclaimer, the term of this patent is extended or adjusted under 35 U.S.C. 154(b) by 0 days.

(21) Appl. No.: 10/146,936

(22) Filed: May 17, 2002

(65) Prior Publication Data

US 2003/0213202 A1 Nov. 20, 2003

(51) Int. Cl.[7] ................................................. A01K 1/00
(52) U.S. Cl. ...................... 119/529; 119/526; 119/450; 52/177; 52/180; 52/581
(58) Field of Search ................................ 119/529, 526, 119/527, 528, 450; 52/177, 180, 581, 664, 670, 673

(56) References Cited

U.S. PATENT DOCUMENTS

| 5,456,209 A | * | 10/1995 | Heinrich | ..................... 119/450 |
| 5,687,534 A | * | 11/1997 | Kongsgaard et al. | ......... 52/664 |
| 5,855,188 A | * | 1/1999 | Kongsgaard et al. | ........ 119/509 |
| 5,862,779 A | * | 1/1999 | Kleinsasser | .................. 119/529 |
| 6,047,663 A |   | 4/2000 | Moreau et al. | |
| 6,079,366 A | * | 6/2000 | Telleen | ........................ 119/525 |
| 6,412,441 B1 | * | 7/2002 | Aja et al. | .................... 119/417 |

FOREIGN PATENT DOCUMENTS

| DE | 30 12 855 | 10/1981 |
| EP | 0 021 280 | 1/1981 |
| EP | 0 472 206 | 2/1992 |
| WO | WO 93 22905 | 11/1993 |

* cited by examiner

*Primary Examiner*—Carl D. Friedman
*Assistant Examiner*—Chi Q. Nguyen
(74) *Attorney, Agent, or Firm*—Andrew R. Wicks; Borden Ladner Gervais LLP

(57) ABSTRACT

An agricultural floor panel and system having a design for improved strength and cleaning is described. The floor panel is designed for support on at least two cross beams. The floor panel has two opposing edges, each edge having a plurality of flanges for supporting engagement on the cross beams and the plurality of flanges defining a plurality of recesses between adjacent flange. The flanges and recesses are adapted for interlocking engagement with corresponding flanges and recesses of an adjacent panel and also include a locking and spacing system for locking adjacent panels together while substantively maintaining a gap between the opposing edges of two adjacent panels.

12 Claims, 7 Drawing Sheets

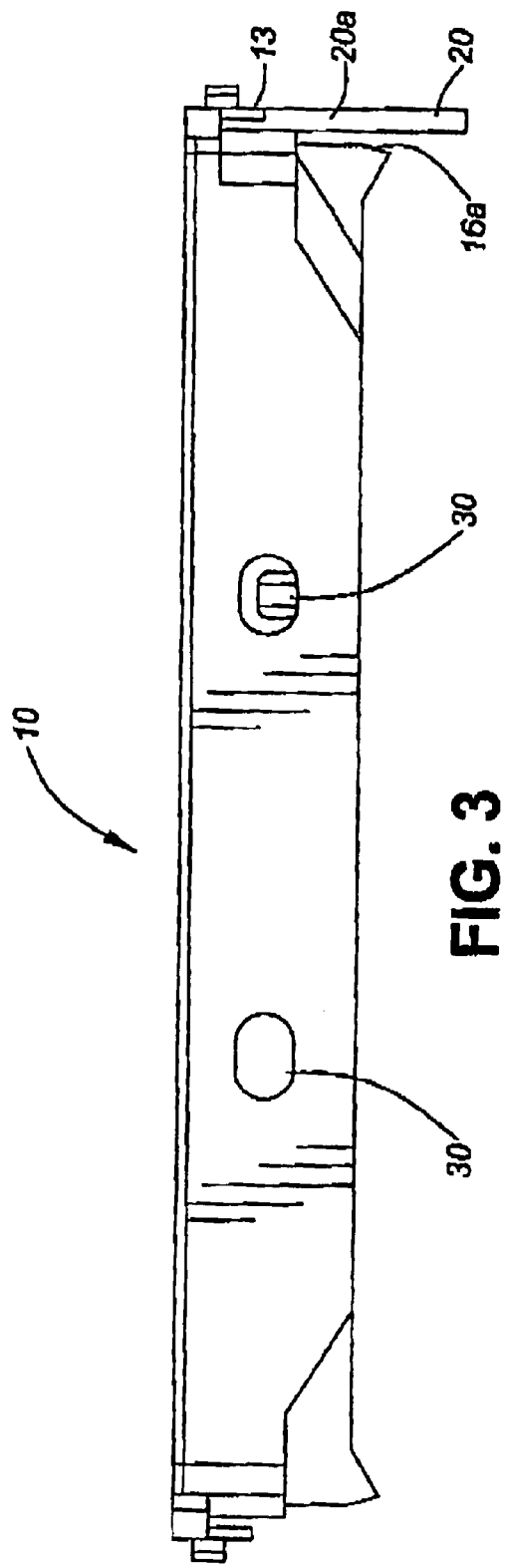
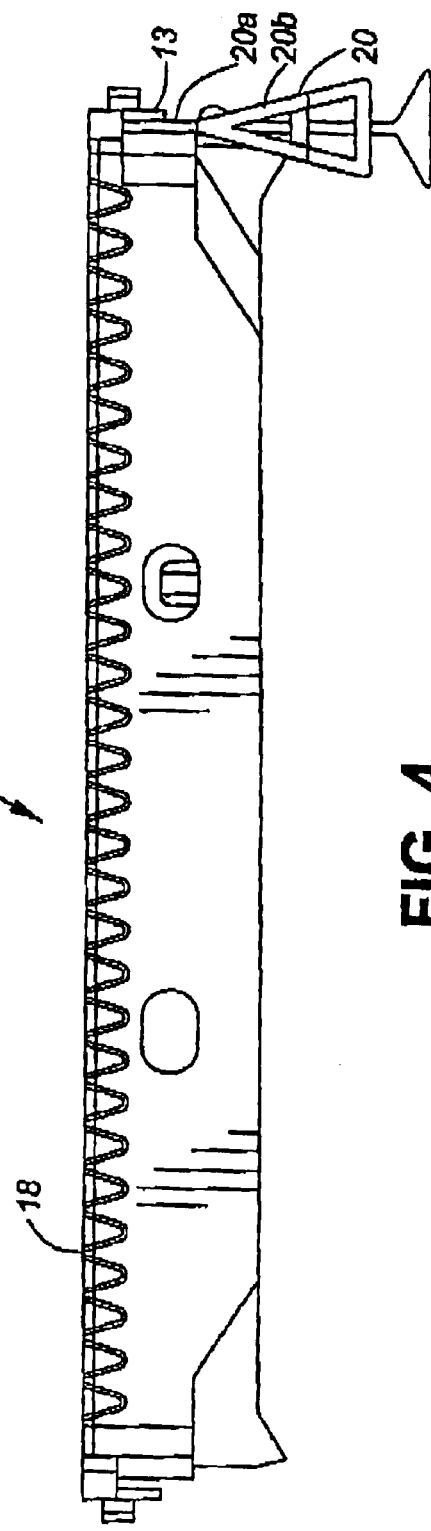

US 6,810,834 B2

AGRICULTURAL FLOOR PANEL

FIELD OF THE INVENTION

An agricultural floor panel and system having a design for improved strength and cleaning is described. The floor panel is designed for support on at least two cross beams. The floor panel has two opposing edges, each edge having a plurality of flanges for supporting engagement on the cross beams and the plurality of flanges defining a plurality of recesses between adjacent flange. The flanges and recesses are adapted for interlocking engagement with corresponding flanges and recesses of an adjacent panel and also include a locking and spacing system for locking adjacent panels together while substantively maintaining a gap between the opposing edges of two adjacent panels.

BACKGROUND OF THE INVENTION

The use of plastic flooring for hog and poultry operations is well known as a method of keeping animal pens clean. Plastic grates or panels supported on a structure of steel or fibreglass beams above a manure pit enables animal manure to pass to the lower manure pit while supporting the animals and farmers above the manure pit.

Ideally, the grated flooring is designed to be easy to clean by pressure washing as is required in order to minimize the risk of disease which may be caused by a build-up of bacteria from the animal's manure on the flooring or within any cracks or crevices on the floor. In addition, the grated flooring must also provide sufficient support to prevent the weight of the animals or the farm personnel from breaking the floor and falling into the pit below. Washing is usually conducted by a farmer using high pressure washers on the top side of the floor.

Within this field, various designs of flooring have been implemented to simplify the use of the panels. For example, past designs have utilized uniform shaped grating panels which facilitate installation on specific beam systems such as steel or fibreglass using a series of hooks and snaps. Such designs may include features which allow for the reversibility of individual grating panels, as well as allowing individual panels to snap together to ensure that the floor is stable and locked after installation. Other features including support ribs or cross ribs ensure that both large and small animals are supported on the flooring while still permitting their manure to be pass and/or be washed through the floor.

In the past, individual panels are snapped and locked to each other and the beam system with very little space between adjacent panels. This absence of space between panels tends to result in a build-up of manure within the small cracks between each panel which cannot be readily removed or dislodged by the normal washing process. In fact, the washing process has a tendency to tightly pack manure into these cracks with the result that around all four edges of the grate panel significant quantities of manure remain even after washing.

Further still, in past designs, the interlocking panels also completely cover the underlying support beam with the similar result that various surfaces of the beam cannot be properly washed from above.

As a result of these deficiencies in the design of past systems, there has been a need for a floor panel system which overcomes these problems and which specifically provides a strong floor panel that can be readily washed by providing sufficient gaps between adjacent panels.

Another problem of past systems is the connection of the panel to the cross beams. In the past, outwardly projecting flanges have supported the entire loading of the panel directly to the upper surface of the cross beam. As a result, past panels may be weakened at or around the flange/cross beam junction resulting in panel failure and possible injury to an animal or farmer. As a result, there has been a need for floor system having a cross beam design which is fully supported by the beam system to improve the overall strength (and hence durability) of the floor system wherein loading on the panel is at least partially transferred to other surfaces of the cross beam.

Further still, there has been a need for a floor panel system where the contact area of four abutting corners is minimized to enable proper cleaning while ensuring that adjacent panels maintain contact for proper alignment.

A review of the prior art has revealed that a floor panel system addressing the above problems has not been provided.

SUMMARY OF THE INVENTION

In accordance with the invention, there is provided a floor panel for support on at least two cross beams, the floor panel comprising a grated panel having two opposing edges, each edge having a plurality of flanges for supporting engagement on the cross beams, the plurality of flanges defining a plurality of recesses between adjacent flanges wherein the flanges and recesses are adapted for interlocking engagement with corresponding flanges and recesses of an adjacent panel, the flanges and recesses further including a locking and spacing system for locking adjacent panels together while substantively maintaining a gap between the opposing edges of two adjacent panels.

In another embodiment, the floor panel further comprises two cross beam edges having at least one spacer for operative engagement with an adjacent cross beam edge to substantively maintain a gap between the cross beam edges of two adjacent panels.

In a further embodiment, the locking and spacing system includes a plurality of pins for locking engagement with corresponding apertures on an adjacent panel wherein the pins project outwardly from respective flanges and the apertures are within respective recesses.

In yet another embodiment, each opposing edge includes at least one corner flange for butting engagement against a corresponding corner flange of a diagonally adjacent panel and wherein each corner flange preferably abuts a flange on a laterally adjacent panel.

In another embodiment, the panel further comprises cross beams and the cross beams and cross beam edges include a cross beam contacting surface for butting and supporting engagement against the support beam.

BRIEF DESCRIPTION OF THE DRAWINGS

FIG. 3 is a side view of a floor panel in accordance with the invention installed on one support beam type;

FIG. 4 is a side view of a floor panel in accordance with the invention showing details of the cross ribs and its installation on an alternate support beam type;

DETAILED DESCRIPTION OF THE INVENTION

With reference to the Figures, a floor panel system 1 having an improved design and which is particularly adapted for use as a suspended floor in poultry and hog operations is described. The improved design enables superior cleaning of the flooring while also providing desirable features of self-alignment and interconnection during installation as well as improved structural and anti-slip characteristics.

Overview

Figure 1:
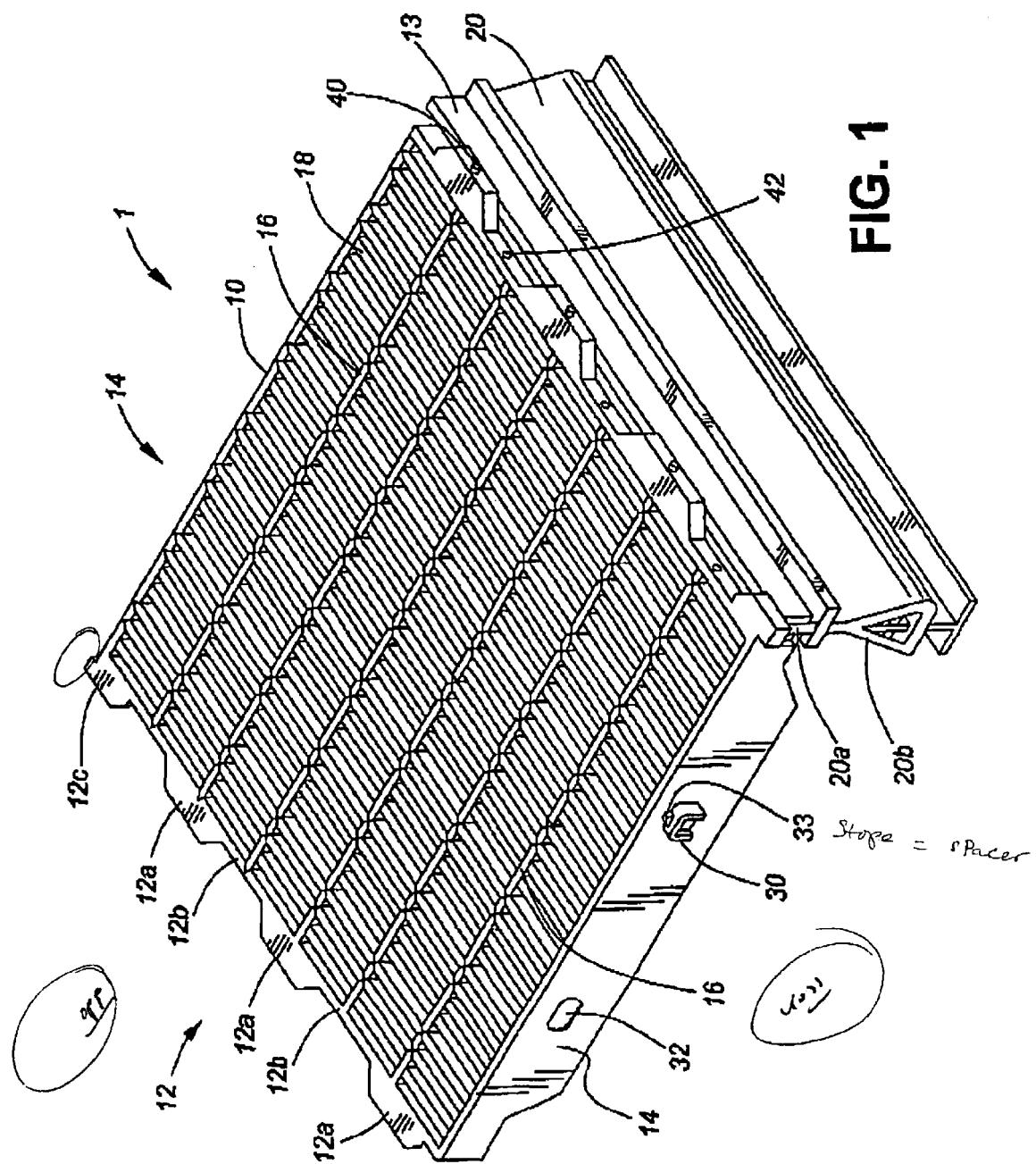
FIG. 1 is a perspective view of the floor panel in accordance with the invention mounted to a support beam.
Figure 2:
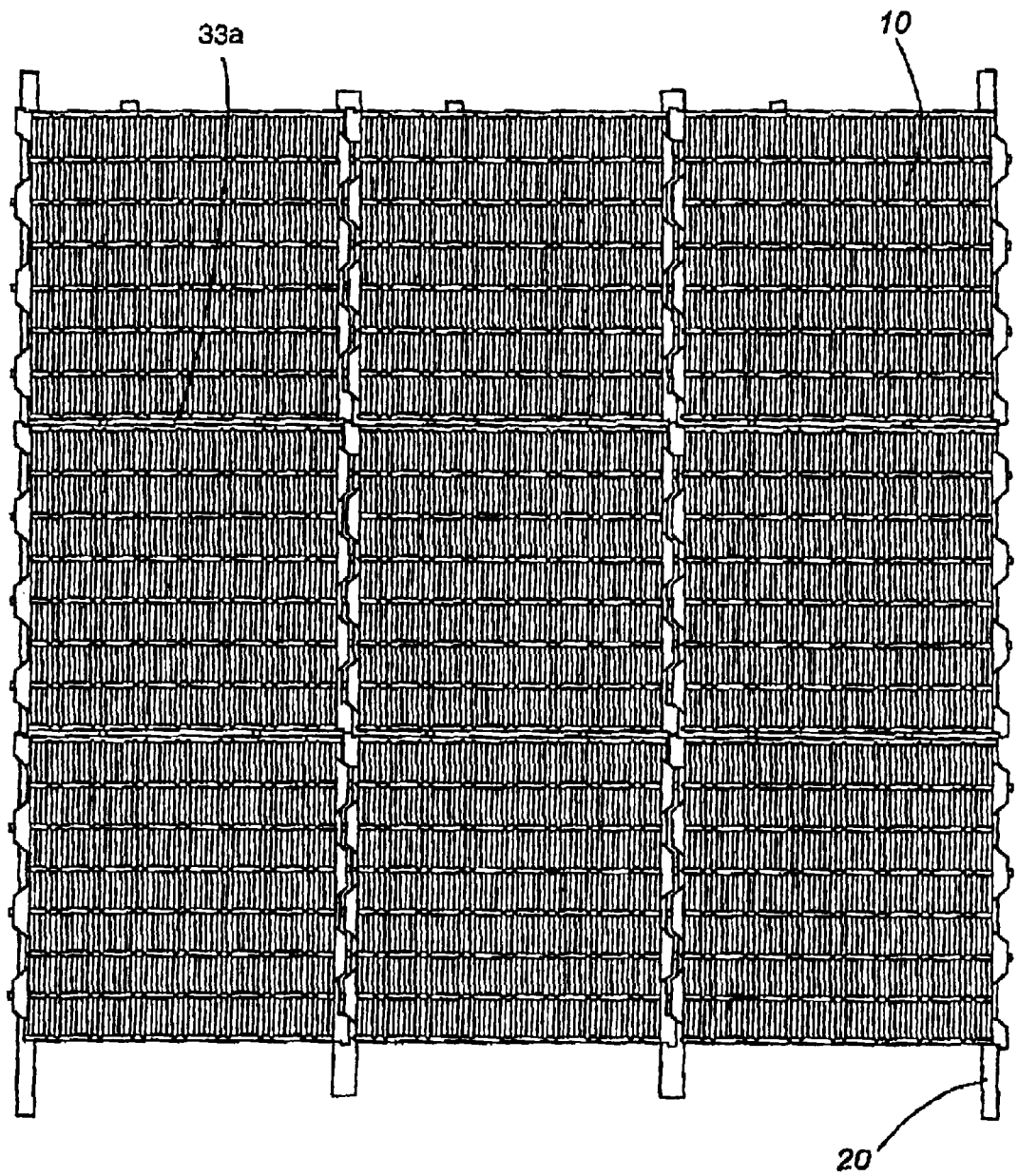
FIG. 2 is a plan view of nine floor panels in accordance with the invention in an interconnected configuration.

With specific reference to FIGS. 1, 2, 3 and 4, a flooring panel 10 in accordance with the invention is shown configured to a representative support beam 20. The support beam would normally be installed over a pit (not shown). As shown in FIG. 2, a plurality of flooring panels 10 may be interconnected together to create a floor surface on the support beam system 20.

Figure 5:
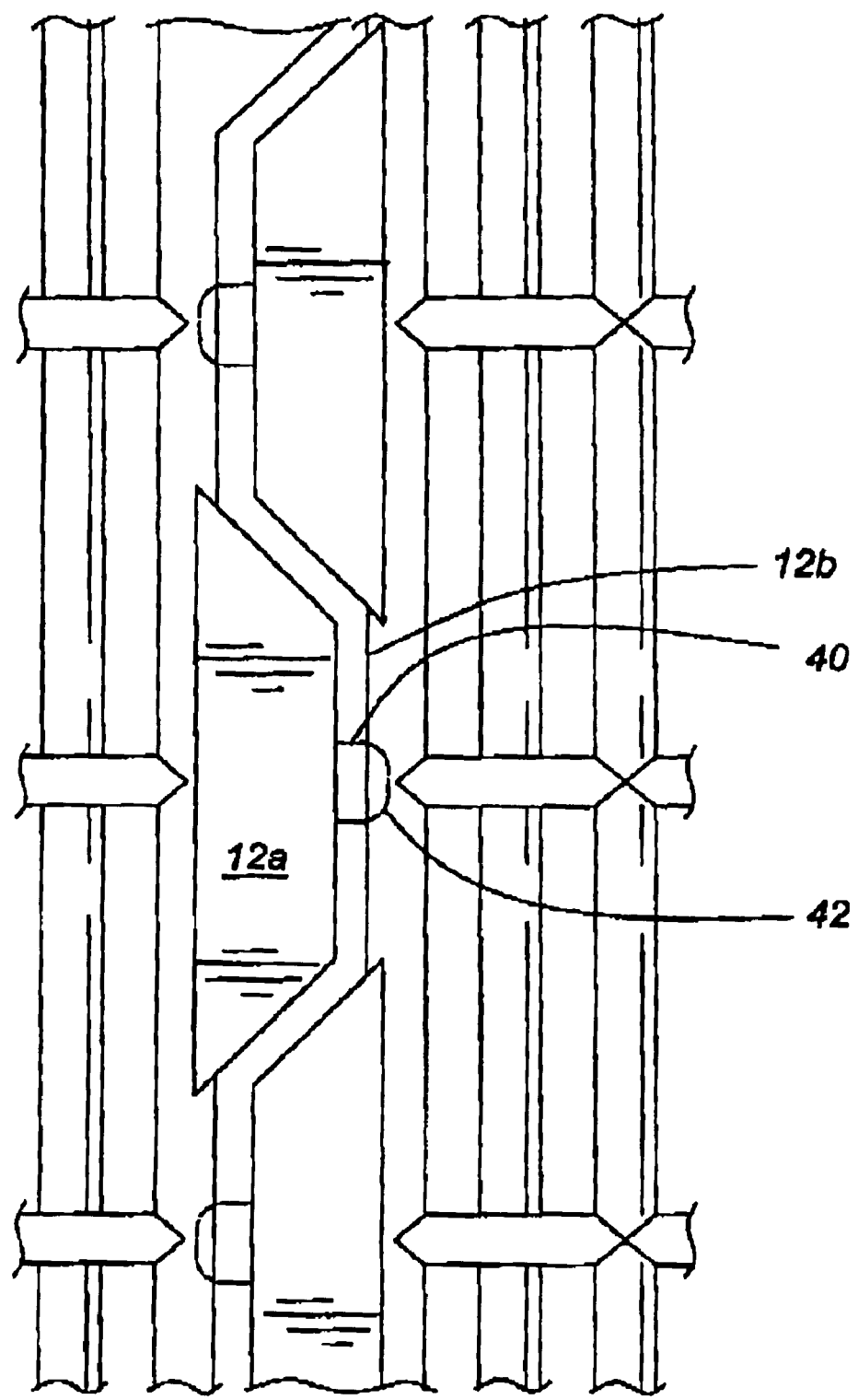
FIG. 5 is a plan view of the locking system of two adjacent flange edges.

As shown in FIG. 1, each floor panel is characterized by beam support edges 12, cross edges 14, cross beams 16 and cross ribs 18. The beam support edges 12 include a system of alternating flanges 12a and recesses 12b designed to interlock with corresponding flanges and recesses on an adjacent panel while maintaining a gap between adjacent panels. The details of the interconnection between adjacent flanges and recesses is shown in FIG. 5 and will be described in greater detail below. The underside of the flanges are also designed to engage with an underlying support beam 20 to support the panel on the beam 20 as shown in FIGS. 1, 3 and 4. Preferably each flange includes a hook 13 for engagement over the cross beam 20 to prevent disengagement of the flange by lateral displacement of the flange with respect to the support beam 20.

Figure 6:
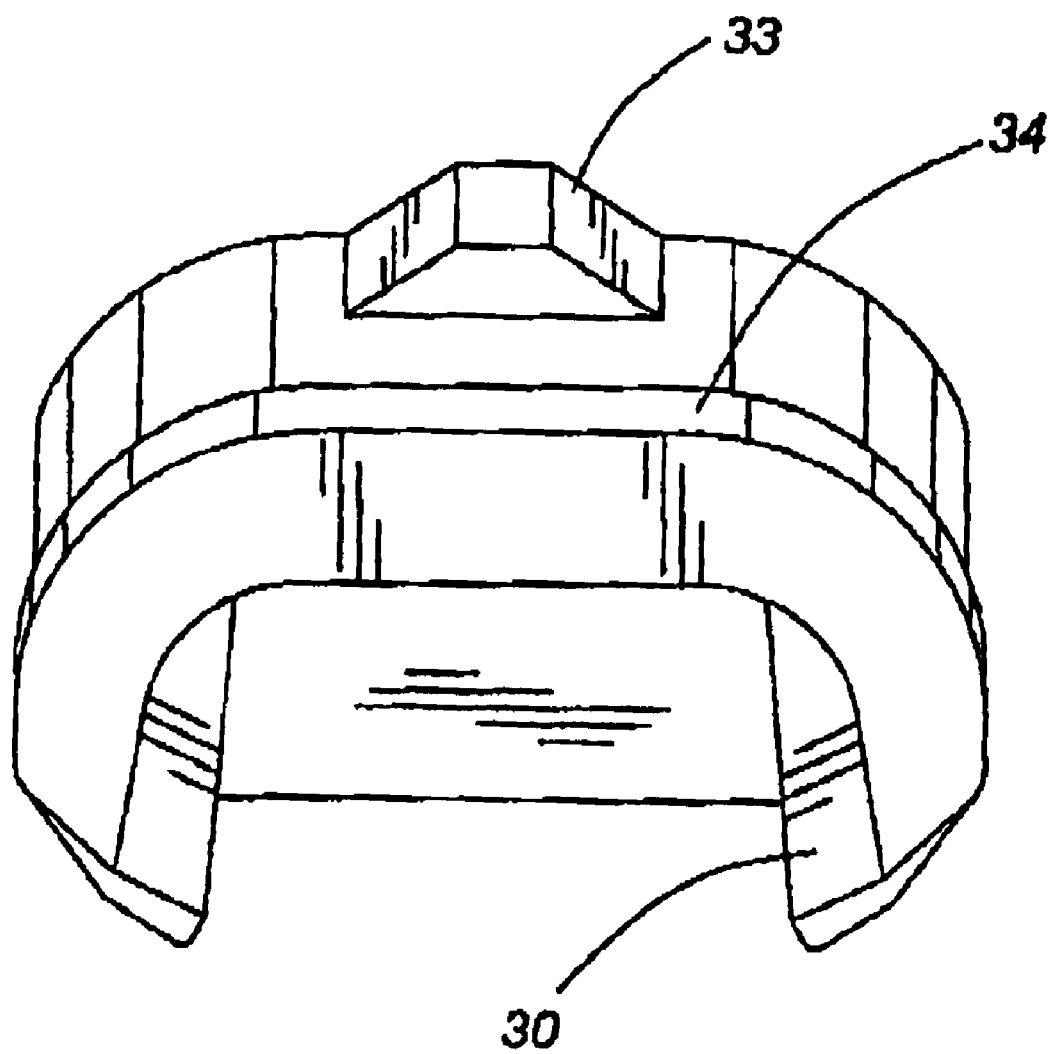
FIG. 6 is a perspective view of a spacing pin on a cross edge.

Each cross edge is generally list as shown in FIG. 1. However, in one embodiment, each cross edge 14 includes an alternating boss 30 and recess or aperture 32 (FIG. 4). The alternating bosses 30 and apertures 32 are designed to interconnect with corresponding bosses and apertures on the cross edge of an adjacent panel while, in a manner similar to the spacing between beam support edges, maintains a gap between adjacent panels. The bosses therefore include a stop 33 (as shown in FIGS. 1 and 6), which acts as a spacer for providing a gap (32a) between cross edges of adjacent panels when assembled as shown in FIG. 2. The bosses may further include a raised locking lip 34, which, through a twisting operation during installation prevents disconnection of the boss 30 from the aperture 32 through a perpendicular withdrawal force.

Figure 7:
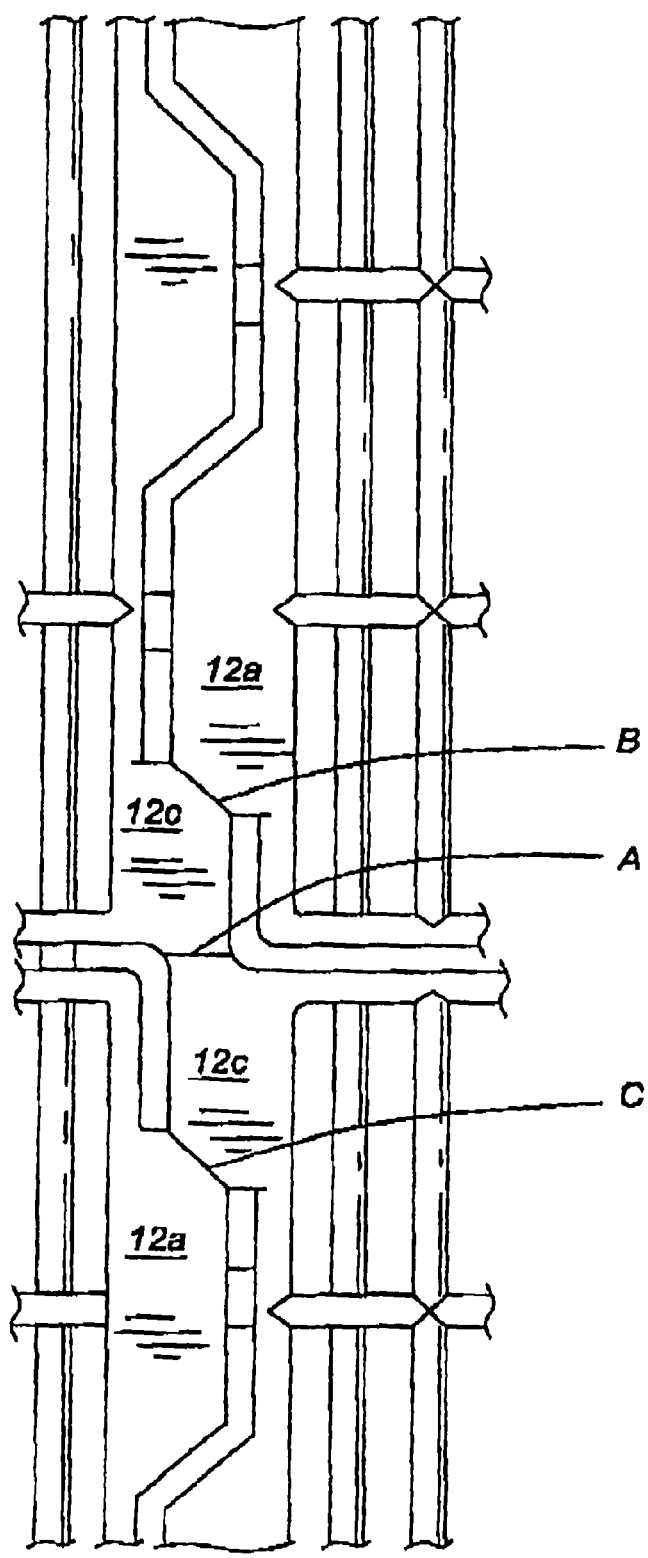
FIG. 7 is a plan view of abutting corners of four adjacent panels in accordance with the invention; and, FIG. 8 is a perspective view of the upper surface of a panel showing details of the raised cross beams.

In addition, each corner of a panel is provided with a corner flange 12c to stabilize the floor and to eliminate shifting in directions parallel to the edges and in the diagonal direction. Each corner of the panel contacts the adjacent three other panels through direct or indirect abutment against the other panels as shown in FIGS. 2 and 7. That is, such corner flange 12c directly abuts the corner flange 12c of the diagonally adjacent panel (location A) while the alternate diagonally adjacent pair of panels abut indirectly by virtue of direct abutments at locations A, B, and C. More specifically, this indirect abutment is enabled through direct contact of an edge of the first flange 12a of each beam supporting edge with corner flange 12c of an adjacent panel as shown by location B, while diagonally opposite first flange 12a indirectly abuts adjacent corner flange 12c as shown by location C.

Beam Support Edges

With reference to FIGS. 1 and 5, details of the flanges 12a and recesses 12b are shown. FIG. 5 shows that each flange 12a includes a boss 40 which engages a corresponding depression 42 in a corresponding recess 12b. Engagement of the boss 40 and depression 42 interconnects the panels while maintaining the separation between the adjacent panels.

Beam Design

As indicated above, the underside of the flanges are preferably shaped to hook over a support beam 20. In the field of agricultural flooring, the profile of the beams used may include a variety of different profiles but will generally include an upper narrow lip 20a (FIGS. 3 and 4) over which the flanges are placed. In a preferred design, as shown in FIG. 4, the beam 20 may include an outwardly sloping base 20b having a triangular cross-section. In this embodiment, and for further structural integrity, the cross edges 14 and cross beams 16 include a lower beam abutment edge 16a for engagement against the sloping surface 20b of the support beam 20. This design distributes additional load from the flooring against the lower regions of the beam 20 and thereby removes load from the flanges 12a.

Cross Edges, Cross Beams and Cross Ribs

The cross edges and cross beams provide structural integrity to the floor panel 10 between adjacent support beams. The cross ribs interconnect adjacent cross beams or cross beams and cross edges. With respect to the cross ribs, each cross rib is preferably provided with a tear drop profile as shown in FIG. 4 in order to minimize the underside surface area of each cross rib on which manure may collect. By providing inwardly tapering surfaces on each cross rib 18, cleaning water can be directed more forcefully against a greater area of each cross rib 18 to remove contaminants.

Figure 8:
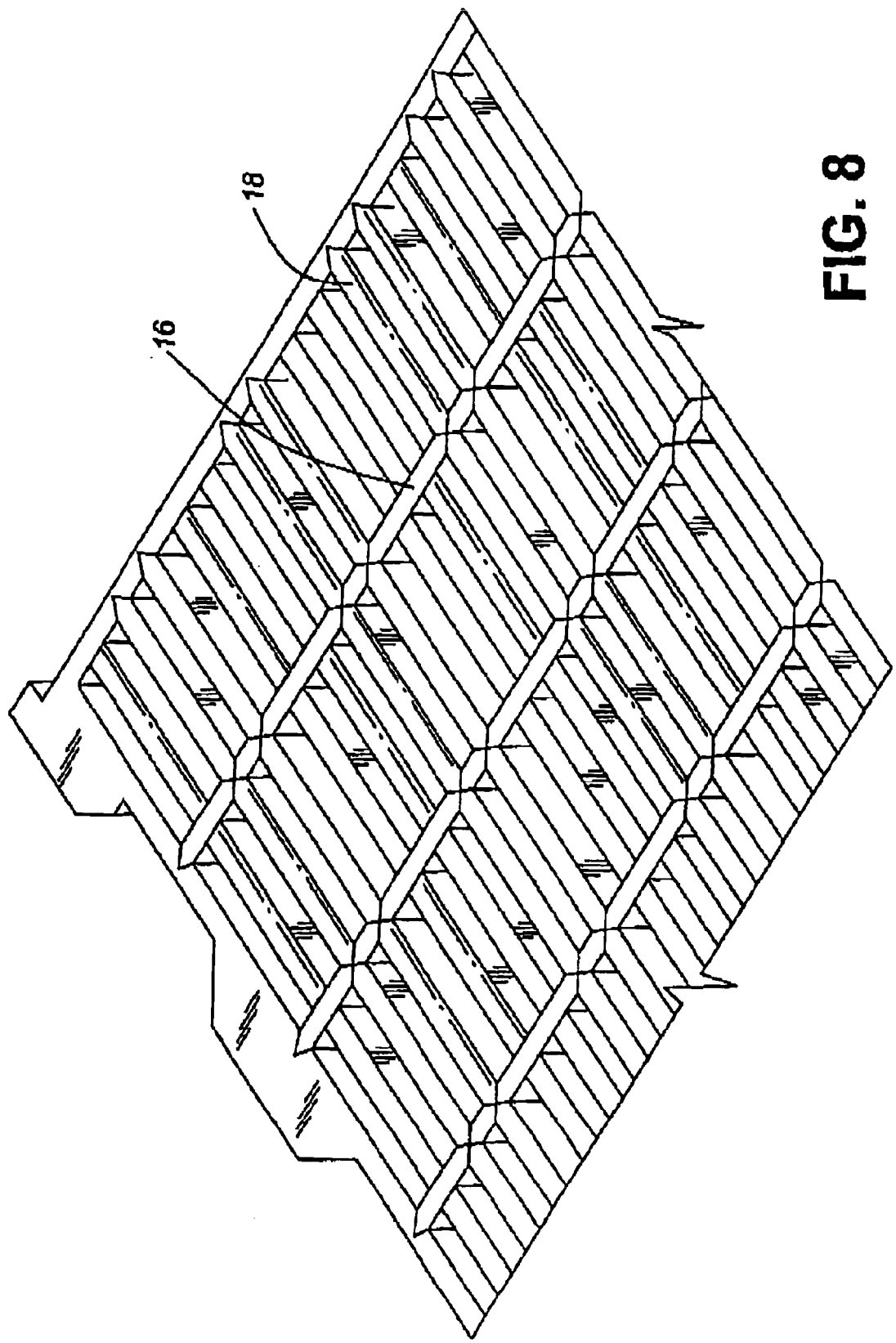

Preferably, the cross ribs are provided with a surface profile to promote the grip as shown in FIG. 8 where the cross beams 16 are elevated with respect to the cross ribs 18.

What is claimed is:

1. A floor panel for support on at least two support beams, the floor panel comprising:

a grated panel having two opposing edges and two cross beam edges;

a plurality of flanges extending from each opposing edge for supporting engagement on the support beams, the plurality of flanges defining a plurality of recesses between adjacent flanges, the flanges and recesses adapted for interlocking engagement with corresponding flanges and recesses of an adjacent panel and having dimensions that substantively maintain a gap between the flanges and recesses of two adjacent panels when interconnected; and a locking and spacing system for locking adjacent panels together while substantively maintaining a gap between the edges of two adjacent panels, the locking and spacing system including a plurality of corresponding bosses and depressions on the opposing edges for engagement with corresponding bosses and depressions on an adjacent panel, the bosses and depressions having dimensions such that a space is defined between adjacent panels when engaged on the support beams.

2. A floor panel as in claim 1 wherein the locking and spacing system includes at least one spacer for abutment with an adjacent cross beam edge, the spacer having dimensions to substantively maintain a gap between the cross beam edges of two adjacent panels.

3. A floor panel as in claim 1 wherein the bosses project outwardly from respective flanges and the depressions are within respective recesses.

4. A floor panel as in claim 1 wherein each opposing edge further includes at least one laterally projection corner flange extending past the cross beam edge for butting engagement against a corresponding laterally projecting corner flange of a diagonally adjacent panel.

5. A floor panel as in claim 4 wherein each corner flange also abuts a flange on a laterally adjacent panel.

6. A floor panel as in claim 1 wherein the panel further comprises cross beams and the cross beams and cross beam edges include a cross beam contacting surface for butting and supporting engagement against the support beam.

7. A floor panel as in claim 2 wherein the locking and spacing system includes a plurality of bosses for engagement with corresponding depressions on an adjacent panel.

8. A floor panel as in claim 7 wherein the bosses project outwardly from respective flanges and the depressions are within respective recesses.

9. A floor panel as in claim 8 wherein each opposing edge further includes at least one laterally projecting corner flange extending past the cross beam edge for butting engagement against a corresponding laterally projecting corner flange of a diagonally adjacent panel.

10. A floor panel as in claim 9 wherein each corner flange also abuts a flange on a laterally adjacent panel.

11. A floor panel as in claim 10 wherein the panel further comprises cross beams and the cross beams and cross beam edges include a cross beam contacting surface for butting and supporting engagement against the support beam.

12. A floor for support on at least two support beams, the floor panel comprising:

a grated panel having two opposing edges and two cross beam edges;

a plurality of flanges extending from each opposing edge for supporting engagement on the support beams, the plurality of flanges defining a plurality of recesses between adjacent flanges, the flanges and recesses adapted for interlocking engagement with corresponding flanges and recesses of an adjacent panel and having dimensions that substantively maintain a gap between the flanges and recesses of two adjacent panels when supported on the support beams; and a locking and spacing system on each cross beam edge for interlocking engagement with a corresponding locking and spacing system on an adjacent panel when interconnected, the locking and spacing system having dimensions that substantively maintain a gap between the cross beam edges of two adjacent panels when interconnected.

\* \* \* \* \*